(12) United States Patent
Brown (10) Patent No.: US 10,775,295 B2
(45) Date of Patent: Sep. 15, 2020

(54) APPARATUS FOR MEASUREMENT OF ROAD SURFACE FRICTION

(71) Applicant: Glen Brown, Edmonton (CA)

(72) Inventor: Glen Brown, Edmonton (CA)

( * ) Notice: Subject to any disclaimer, the term of this patent is extended or adjusted under 35 U.S.C. 154(b) by 340 days.

(21) Appl. No.: 15/890,458

(22) Filed: Feb. 7, 2018

(65) Prior Publication Data

US 2019/0242809 A1 Aug. 8, 2019

(51) Int. Cl.
*G01N 19/02* (2006.01)
*F16M 13/02* (2006.01)
*B60T 8/172* (2006.01)

(52) U.S. Cl.
CPC ........... *G01N 19/02* (2013.01); *F16M 13/022* (2013.01); *B60T 8/172* (2013.01); *B60T 2210/12* (2013.01); *B60T 2260/06* (2013.01)

(58) Field of Classification Search
CPC ............................. G01N 19/02; B60T 2210/12
See application file for complete search history.

(56) References Cited

U.S. PATENT DOCUMENTS 6,928,857 B1 * 8/2005 Brown .................... B60T 8/172
73/9

* cited by examiner

*Primary Examiner* — Herbert K Roberts
(74) *Attorney, Agent, or Firm* — Adrian D. Battison; Ade & Company Inc.; Kyle R. Satterthwaite (57) ABSTRACT

A CFME apparatus for continuously measuring coefficient of friction of a paved runway or paved road at any speed up to 105 kilometers per hour with improved efficiency for more precise measurements on ice-contaminated pavement, the improved precision being achieved by reducing the standard deviation in the file of recorded measurements normally recorded at an average rate of one measurement per second includes a frame attached to a vehicle mounting a vertical rotatable shaft pivotally carrying a suspension arm trailing rearwardly and downwardly so as to carry a test wheel at a rear end thereof in a wheel plane different from a forward plane to swivel about an upstanding axis in response to a torque applied to the suspension arm about the upright axis by the test wheel. A sensor is responsive to changes in the angle between the forward plane and the wheel plane caused by changes in coefficient of friction. A divider shield separates the test wheel, the suspension arm and the lower end of the upstanding member below the divider shield from the sensor at the upper end. A vibration damping coupling is provided between the mounting of the suspension arm and the upper end of the vertical shaft.

16 Claims, 4 Drawing Sheets

APPARATUS FOR MEASUREMENT OF ROAD SURFACE FRICTION

This invention relates to an apparatus for providing an indication to a vehicle operator of a co-efficient of friction of a road surface. The standard term for this category of equipment is CFME (Continuous Friction Measurement Equipment).

BACKGROUND OF THE INVENTION

The presence of winter weather-related contamination on pavement is a contributing factor in many aircraft runway excursions occurring during touch down and take off. Tire to road friction is significantly diminished by ice contamination and measurements of friction are directly relevant to the braking action which will be available to an aircraft and as such there are regulations requiring that the friction of the runway surface be evaluated with approved friction testing equipment during winter weather events. Continuous Friction Measurement Equipment or CFME is not yet universally-approved for runway condition assessment in winter weather events. Reduction of the standard deviation of the measurements of coefficient of friction is key to ensuring that the displayed friction measurements are representative of braking action available at any geographic location and therefore a CFME-type tester with improved standard deviation of sensor output signal is advantageous.

One arrangement for continuous road friction measurement is provided in U.S. Pat. No. 6,928,857 issued Aug. 16 2006 of the present applicant which provides an arrangement to accurately measure road friction. The present arrangement provides an improvement to the construction shown in this patent.

SUMMARY OF THE INVENTION

According to the present invention there is provided an apparatus for measuring the co-efficient of friction of a paved road surface comprising:

a test wheel for rolling on the paved road surface;

a frame structure arranged to be attached to a road transportation vehicle moving along a direction plane of forward travel at a location thereon such that the test wheel rolls on the road surface in a wheel plane as the vehicle moves in the direction plane over the road surface;

an upstanding member pivotally connected to said frame structure by a first swivel connection for pivotal movement about an upstanding axis;

a suspension arm pivotally connected to said upstanding member by a second swivel connection about a substantially horizontal axis and trailing rearwardly and downwardly therefrom so as to carry said test wheel at a rear end thereof in said wheel plane different from said forward plane;

said first swivel connection allowing said upstanding member to swivel about said upstanding axis in response to a torque applied to said suspension arm about the upright axis by said test wheel running in a wheel plane different from the forward plane;

said second swivel connection allowing said suspension arm and the test wheel to pivot about the horizontal axis upwardly and downwardly to accommodate changes in ground height;

a sensor responsive to changes in the angle between the direction plane and the wheel plane caused by changes in coefficient of friction allowing the wheel plane to move out of the forward plane;

and a display for displaying data related to the changes in angle detected by the sensor;

said sensor being connected to the upstanding member adjacent an upper end of the upstanding member and said suspension arm and the second swivel connection being connected to the upstanding member adjacent a lower end of the upstanding member;

and a divider shield separating the test wheel, the suspension arm and the lower end of the upstanding member below the divider shield from the sensor adjacent the upper end above the divider shield.

Preferably the upstanding member is mounted in upper and lower bearings defining first swivel connection where the upper bearing is above the divider shield and the lower bearing is below the divider shield.

Preferably the second swivel connection and the suspension arm is connected to the upstanding member by a member allowing some flexible coupling therebetween while ensuring that the coupled components on either side of the coupling turn together as a single piece about said first swivel connection. In one arrangement, the member allowing flexible coupling comprises a flexible plate which is attached to the components in a manner which allows sufficient flexibility to take up vibration caused by the movement of the suspension arm. However other more specific flexible couplings may be provided such as resilient rubber mountings or universal couplings.

The purpose of the divider shield is that it provides a plate separating the ground engaging components from the sensing components preventing material ejected from the test wheel running on the ground from accessing the sensor. Preferably the divider shield is attached to the vehicle. For example the divider shield can comprise a floor panel of the vehicle.

Preferably the divider shield has an opening in the floor panel through which the upstanding member passes.

Preferably the sensor is mounted on a support in the form of a frame attached to the vehicle above the divider shield. In this case preferably the upper bearing is attached also to the support above the divider shield so that the bearing is held properly fixed to the support to maintain the axes properly aligned and located.

Preferably there is provided a stabilizer arm attached to the upstanding member for pivotal movement therewith and a spring assembly applying a spring force between the stabilizer arm and the vehicle about said generally upright axis tending to rotate said upstanding member and said test wheel carried thereby around the axis to a position defining for the wheel plane of the test wheel an angle of yaw relative to a forward plane, such that, when the vehicle is traveling along the forward plane with adequate co-efficient of friction, the test wheel tends to lie with the wheel plane parallel to the forward plane and, when the co-efficient of friction is reduced, the wheel plane tends to revert to the angle of yaw.

Preferably the spring assembly comprises a first spring on one side of the stabilizer arm connected to the support frame and acting to push the stabilizer arm to the required angle relative to the forward plane of the vehicle and a second spring on a second side of the stabilizer arm pushing in the opposite direction.

Preferably the sensor is mounted on a support frame attached to the vehicle above the divider shield and the spring assembly with the first and second springs is connected between the support frame and the stabilizer arm.

In order to provide required data collection preferably the display comprises a gauge and computer and wireless electronic transmitter connected to the sensor to display, record, and transmit said measurements to a remote location.

Preferably there is provided a shock absorber acting in a vertical plane mounted between the upstanding member and the suspension arm to impede vertical deviation during a vertical bounce and rebound cycle of the test wheel.

According to a second aspect of the invention there is provided an apparatus for measuring the co-efficient of friction of a paved road surface comprising:

a test wheel for rolling on the paved road surface;

a frame structure arranged to be attached to a road transportation vehicle moving along a direction plane of forward travel at a location thereon such that the test wheel rolls on the road surface in a wheel plane as the vehicle moves in the direction plane over the road surface;

an upstanding member pivotally connected to said frame structure by a first swivel connection for pivotal movement about an upstanding axis;

a suspension arm pivotally connected to said upstanding member by a second swivel connection about a substantially horizontal axis and trailing rearwardly and downwardly therefrom so as to carry said test wheel at a rear end thereof in said wheel plane different from said forward plane;

said first swivel connection allowing said upstanding member to swivel about said upstanding axis in response to a torque applied to said suspension arm about the upright axis by said test wheel running in a wheel plane different from the forward plane;

said second swivel connection allowing said suspension arm and the test wheel to pivot about the horizontal axis upwardly and downwardly to accommodate changes in ground height;

a sensor responsive to changes in the angle between the direction plane and the wheel plane caused by changes in coefficient of friction allowing the wheel plane to move out of the forward plane;

and a display for displaying data related to the changes in angle detected by the sensor;

said sensor being connected to the upstanding member adjacent an upper end of the upstanding member and said suspension arm and the second swivel connection being connected to the upstanding member adjacent a lower end of the upstanding member;

wherein the upstanding member is mounted in upper and lower bearings defining first swivel connection;

wherein the sensor is carried by a support attached to the upper bearing;

wherein the second swivel connection and the suspension arm are connected to the upstanding member above the lower bearing;

and wherein the second swivel connection and the suspension arm are connected to the upstanding member by a member allowing flexible coupling therebetween.

The present invention therefore relates to a friction measuring apparatus that is incorporated in a motor vehicle, to a large extent enabling automatic measuring methods, and is especially advantageous for measurements on paved surfaces while traveling at the speed of highway traffic. The measuring apparatus includes a single test wheel attached to a vehicle used in road transportation, said wheel engaging the road surface during measuring operations at a slight angle of yaw and retractable when not required, a trailing suspension arm, an intermediate component between the wheel and the vehicle allowing movement of the trailing suspension arm about both a vertical axis of rotation and about a horizontal axis of rotation, a spring mounted to pull or push the hinged component to establish the angle of yaw, a sensor mounted at a given radius from the vertical axis of rotation to measure the change in the angle of rotation of the intermediate component.

In the operational mode, the test wheel is attached to the suspension arm with its alignment intersecting the vertical pivotal axis between the suspension arm and the vehicle, an arrangement that allows the friction at the contact patch of the tire on the road to force the test wheel toward an angle of yaw of zero degrees. The greater the co-efficient of friction, the greater the centering force. The force of the horizontal spring resists the centering force caused by friction. The change in the angle of yaw is dependent upon the change in the co-efficient of friction.

The efficient operation of a continuous road surface friction tester depends on the output signal from a transducer or other sensor capable of measuring force, rotational movement, or linear movement. That output signal is required to correspond to changes in the available friction. Available friction is a term describing changes in the road surface independent of the means used to take measurements. In many continuously-measuring devices the output signal is converted to a measurement on a scale of ascending friction. Therefore the integrity of that output signal is paramount.

In the current application the linear position indicator is the preferred embodiment, to generate an output signal. In a friction tester as described in U.S. Pat. No. 6,928,857 a small measurable angular rotation of components is created by a change in the available friction. A linear transducer may be connected to record the rotational movement in a horizontal plane of an arm at a distance from the axis of rotation. The measurement signal of a sensor measuring linear or angular movement is adversely affected by the impacts to the test wheel at a road surface which result in vibration or shaking at the connections to the sensor.

The arrangement herein provides an improved apparatus which has been built to isolate unwanted deleterious and spurious vibration at the linear transducer. The new patent relates to an improved apparatus that eliminates unwanted, spurious vibration before it reaches the components which are connected to the transducer.

Friction testing is frequently carried out on airport runways or paved highways in winter. The purpose of such testing is to evaluate weather-related road conditions. Winter weather-related friction testing should be continuous from start to finish of the highway when weather is inclement. It is not practical for this testing to be done at slow speeds if time is critical, if a slow moving vehicle will be a hazard, or if productivity in terms of kilometers tested per day is a major concern.

Testing for ice conditions on highways frequently requires operating a friction testing vehicle at speeds in excess of 80 kilometers per hour in order to avoid creating a potential hazard on the highway. At these higher testing speeds an uneven surface will result in impacts and vibrations to a friction testing tire as it rolls over and traverses those bumps. The deleterious vibrations must be dampened or the measurement of the frictional force between the tire and road will be subject to error. The linear transducer in a friction testing apparatus is mounted between two components, usually a stationary connection and a movable connection. There should be no road vibration or other shaking movement at either connection.

The ability to test at higher speeds is desirable for fleet operations, commercial contractors, and others because of productivity demands. The viability of continuous friction testing at higher speed is dependent upon having the standard deviation of the output signal used to generate reports and also the standard deviation of the measurements in the reports generated, at an acceptable level. A significant reduction of the standard deviation permits reporting with a small margin of error. This is of particular importance when relating geographic co-ordinates to a measured value of friction since the practice of averaging or smoothing of data electronically creates a delay or separation between the geographic coordinates reported for a specific measurement and the correct geographic co-ordinates.

When re-designing the present apparatus to make it more practical commercially, it was discovered that the output signal from the transducer could be improved immensely by installing a steadying bearing in combination with a slightly flexible component between the lower part of the friction tester that is shaking and vibrating due to road vibration, and the point of connection of the horizontal arm to which the linear transducer is connected. If the steadying bearing is itself on a separate mounting frame from the main or lower mounting frame, the bearing is vibration free and a vertical shaft rotatably held by the inner race of the bearing is also vibration free. If that vertical shaft is clamped to the horizontal arm near the steadying bearing the horizontal arm will not be subjected to any vibration from the components below, especially the moment forces on the intermediate component. The suspension arm forward end and the top shock absorber mount, impart a moment to the intermediate component every time that the tire hits a bump. Therefore these shaking forces must be dampened.

In this arrangement a round shaft is used to align the steadying bearing with the axis of rotation of the bearing axle assembly that attaches the intermediate component to the main mounting frame. A vertical post is clamped to the shaft and this post is bolted to the intermediate component at the bottom end by a slightly flexible connection, and the post connects by a bolting plate to the horizontal arm at the top end. The post is also clamped to the shaft near the steadying bearing. The horizontal arm, the vertical post, a slightly flexible component at the base of the post linking it to the intermediate component, and the intermediate component comprise one large, rigid, assembly and move together about a vertical axis of rotation.

The first advantage of this arrangement is that the linear transducer measures only the angular rotation of the vertical post and shaft, which correspond to the swinging of the suspension arm and test wheel from left to right or right to left about the vertical axis of rotation. The linear transducer is isolated from spurious vibration primarily by the use of a shaft and post steadied at the top by a bearing.

The second advantage, is that the horizontal springs involved in creating torque on the intermediate component around a vertical axis, are out of the corrosion and mud, and are accessible for servicing. The linear transducer is very sensitive and it must be accessible. These components are now accessed easily in the box of the pickup truck or otherwise above the panel of the vehicle. The components which cannot be exposed to road salt, especially the linear transducer (and load cell and rotary encoder if needed) are above the floor of a pickup truck box and have an enclosure around them. On larger vehicles such as cube vans, a protective box may be mounted below the bed in an accessible location rather than above the bed/floor of the cargo area.

The mounting frame on the vehicle with the vertical member passing through a plate of the vehicle allows two friction testers to be installed with only the testing tires protruding beyond the rear bumper of the truck, leaving access to the tailgate and the box. It also allows the intermediate component to be installed as far forward as possible otherwise everything would have to be ahead of the rear wheels. This tire position significantly reduces erroneous measurements on curves with tight radius such as exit ramps on highways.

In this way the main mounting frame has been designed to allow installation at the optimal position for pickup trucks to obtain the best results during highway testing and runway testing.

Thus the frame is important to allow the vertical shaft to pass through the floor of the box and still have the test tire in the wheel track. The sensor mounting frame above the floor of the pickup box also forms part of the larger apparatus for removing road vibrations.

Thus the present system provides an arrangement that prevents unwanted vibration from adversely affecting the horizontal coil spring pair and especially the connections for the linear transducer. This is done by separating the functions with a separate mounting frame to the vehicle. The location of those components is a dry location protected from road spray and is preferably above the intermediate component, to minimize the necessity for hinged connections which could cause free play or internal friction.

Spurious vibration and other shocks which might shake the springs and components become more of a problem to accuracy as the vehicle travels faster, unless this problem is addressed. Common causes of vibration are uneven road surfaces caused by pavement heaving, pavement cracking, uneven hard-packed snow, uneven ice, and patched pavement.

DESCRIPTION OF THE PREFERRED EMBODIMENTS

The preferred embodiments are now described in detail with reference to the relevant drawings.

Figure 1:
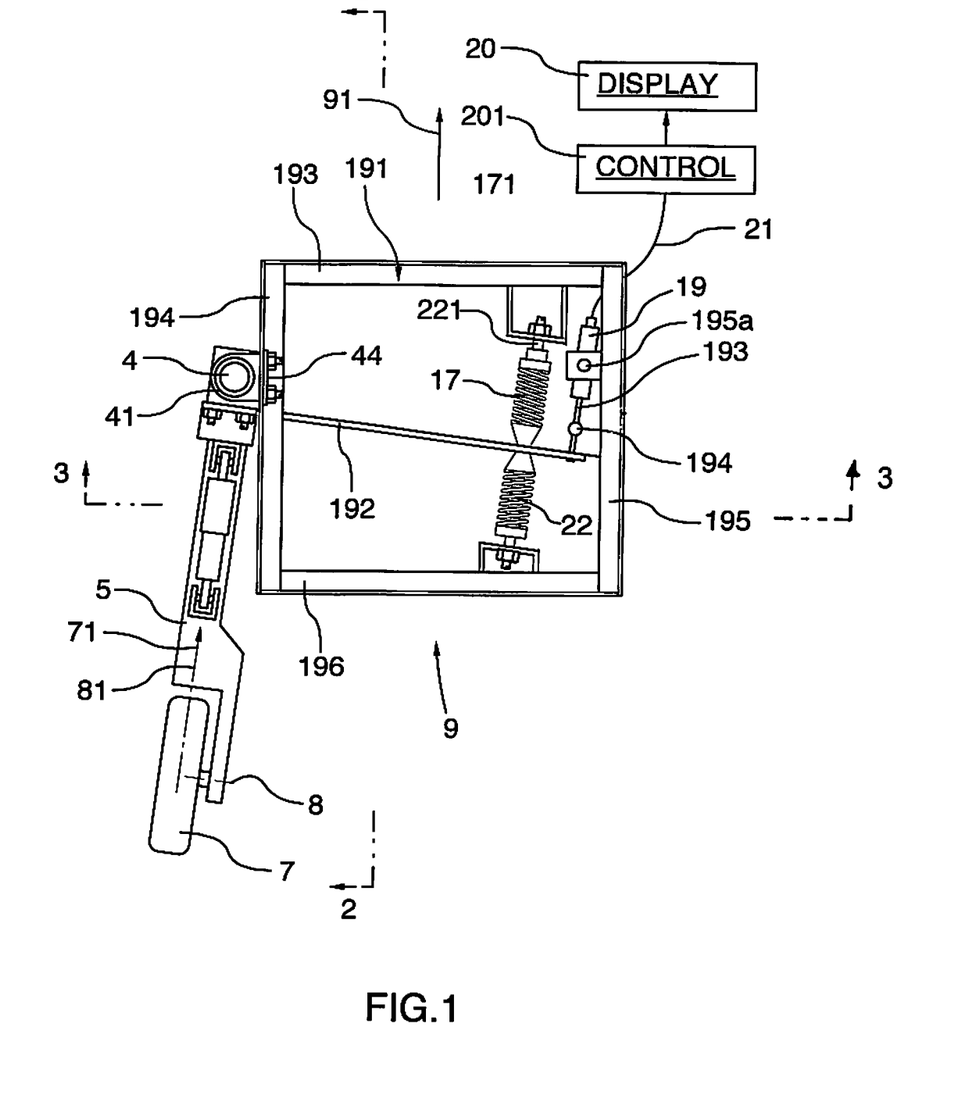
FIG. 1 is a top plan view of an embodiment according to the invention.

FIG. 1 is a plan view of one of the preferred embodiments. The primary frame 1 which serves to mount the apparatus to a transport vehicle is mounted to the chassis or other structurally sound component of the vehicle by a mounting bracket as described in more detail hereinafter.

The primary frame 1 is pivotally connected to an intermediate component 3 including a shaft 4 and bearing assembly including upper bearing 41 and lower bearing 42 with substantially vertical axis 43. The intermediate component 3 is connected to the suspension arm 5 by a shaft 6 and bearing assembly 61 with substantially horizontal axis 62. The test wheel with pneumatic tire 7 is rotatably mounted on the suspension arm 5 by a high speed axle assembly 8 with the test wheel's alignment lying along a radial line 81 from the vertical shaft 4.

FIG. 1 also shows a first shock absorber 18 acting in a horizontal plane and tangential to a radius from the vertical swivel axis 43. A dampening device provided by a steering type dampener 18 is desirable to dampen and moderate side-to-side movement of the test wheel about the axis 43.

The steering dampener 18 acts between an arm 181 attached to the intermediate component 3 and a component 182 of the frame of the vehicle.

In FIG. 1 the arm and dampener 18 is connected to the lower part of the shaft 4 at the intermediate component. The steering dampener is designed to operate both ways with the same force. It helps to remove vibration and is necessary to protect the suspension arm from swinging violently if struck laterally on the test tire. It is not possible to put the dampener 18 at top of the shaft since a violent shock sideways could put everything out of calibration. It needs to be adjacent the lower bearing.

The measurement of the angle of rotation of the intermediate component 3 is accomplished by a potentiometer 19 mounted between an arm 192 attached to the intermediate component 3 and the support frame 191. A first spring 22, and second spring 17 are connected between arm 192 and the frame 191. The linear movement measured by the potentiometer 19 is therefore dependent upon the angle of rotation of the intermediate component about the vertical swivel axis 4 as well as being dependent upon the initial tension in the springs 17, 22 and the spring modulus of the springs 17, 22. The potentiometer 19 transmits an electrical signal to a control computer 201 with display 20 which processes the signal and sends the measurements to a computer via a cable 21 or wireless connection. In addition to the visible display of measurements on the gauge, the computer 201 may produce a visual display or audible warning as well as recording and transmitting data to remote locations through wireless communications.

Figure 2:
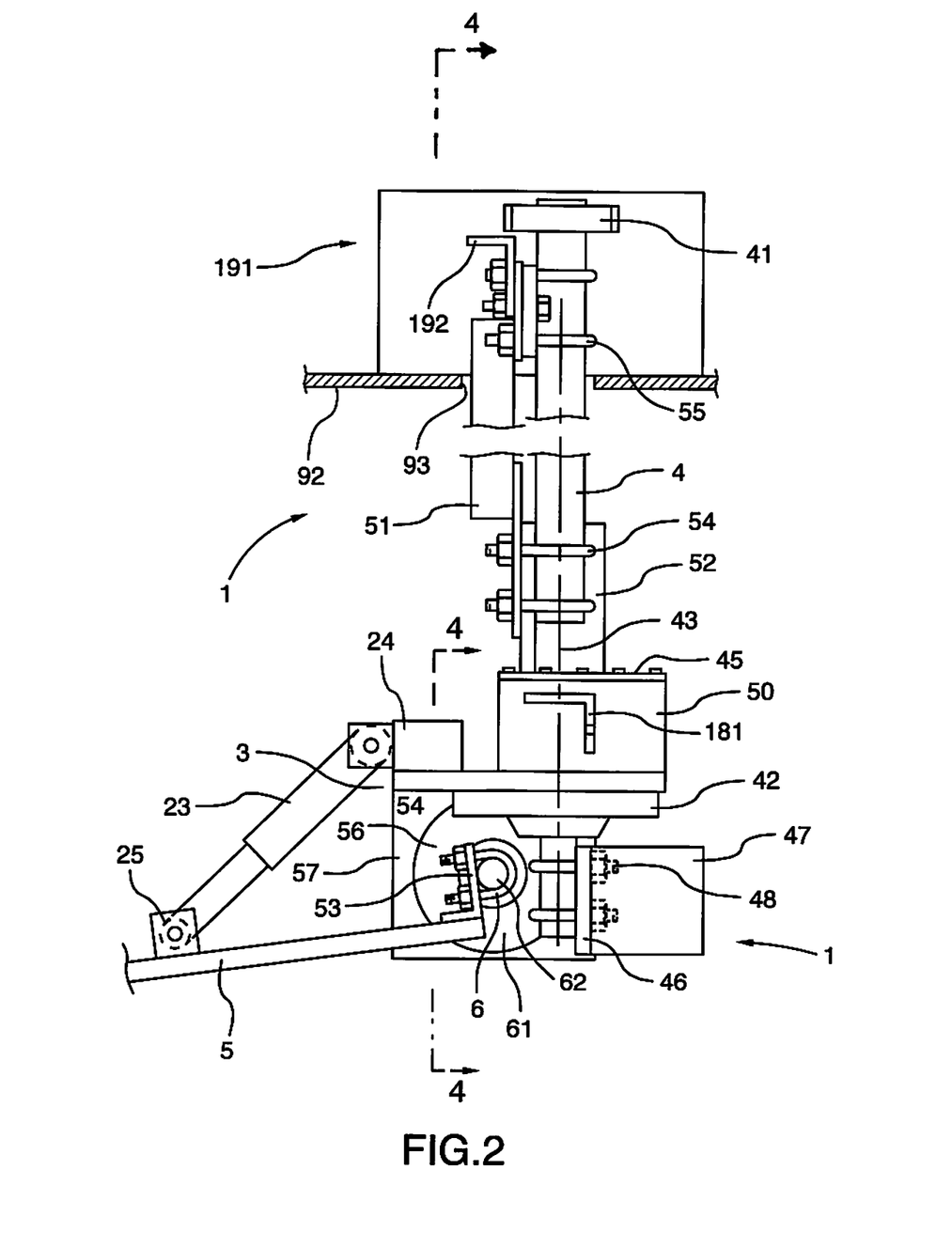
FIG. 2 is a view along the lines 2-2 of FIG. 1 of the embodiment of FIG. 1.
Figure 3:
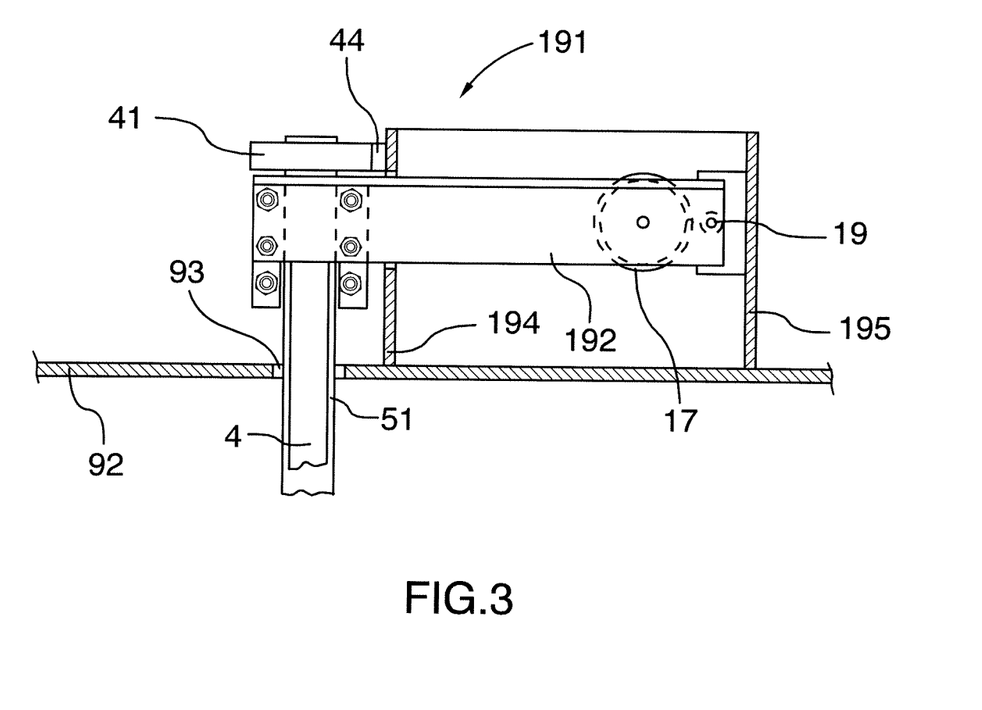
FIG. 3 is a view along the lines 3-3 of FIG. 1 of the embodiment of FIG. 1.

FIG. 2 shows a right side elevation view of the embodiment in which a second shock absorber 23 acts in a vertical plane and tangential to the horizontal swivel axis 6. This view serves to show the relative positions of the primary frame 1, the intermediate component 3, the vertical swivel axis 43, the suspension arm 5, the horizontal swivel axis 6, the shock absorber mount 24 on the intermediate component, and the shock absorber mount 25 on the suspension arm.

The drawings, while not specifying exact dimensions and geometry, show the essential parts of the invention and the arrangements of these parts that have been found to produce acceptable results. Various arrangements of horizontal springs 22 and 17 shown in FIG. 1 have been found to work equally well. The location may vary as long as the required moment is imparted to the intermediate component about the vertical swivel axis 43. Each of the two springs 22 and 17 may be mounted using separate threaded rods and thus permit a wide range of combinations of yaw angle and spring preload. The coil springs shown may be substituted by torsion or other springs.

Accuracy of friction measurements is largely dependent upon the design factors such as the weight on the test wheel, tire characteristics, moment of inertia, spring modulus and dampening. In this respect, the sensor is only one of many factors and therefore it may be a linear scale, force gauge, or rotary encoder, as long as the measurements directly or indirectly indicate the rotation of the intermediate component about the vertical swivel axis 43.

There are available instruments for reading the angular rotation directly but this is not necessary. The sensor 19 responds to linear movement along a chord or tangent rather than angular movement. Accordingly the relationship between the readings and the angular rotation will not be exactly proportional. For this application the accuracy is sufficient. The sensor is mounted at a sufficient radius from the vertical swivel axis, and the angular rotation is sufficiently small, so the change in distance along a tangent or chord of the circle is closely proportional to the angular rotation.

The embodiments described typically are used in conjunction with an electronic display and computer to provide the driver with real time information and, when desired, to make a continuous record and profile of the friction measurements linked to geographic co-ordinates.

The measurements of change in the angle of rotation can be converted into co-efficient of friction, skid resistance, or estimated vehicle stopping distance, by making up tables through experimentation. Either force or linear measurements may be used to find the change in the angle of rotation. The force (load cell) measurements vary according to the compression in the spring which is a function of the angle of rotation. The linear scale measurements are taken along a chord of a circle with center on the vertical axis of rotation. The change in linear distance along a chord is proportional to the change in the angle of rotation.

The apparatus for measuring the co-efficient of friction of a paved road surface therefore comprises the test wheel 7 for rolling on the paved road surface. The support frame 191 defines a generally rectangular container with upstanding walls 193, 194, 195, and 196 within which the sensor 19 and the springs 17, 22 are located.

The frame structure 1 is attached to the road transportation vehicle 9 moving along a direction plane of forward travel 91 at a location thereon such that the test wheel 7 rolls on the road surface in a wheel plane 71 as the vehicle moves in the direction plane 91 over the road surface.

The upstanding shaft 4 is pivotally connected to the frame structure 1 by the upper bearing 41 which is connected to the container 191 at the wall 194 by a bracket 44. The bearing 41 allows for pivotal movement of the shaft 4 about the upstanding axis 43.

The suspension arm 5 is pivotally connected to the upstanding shaft 4 by a second swivel connection 61 for rotation about a substantially horizontal axis 62 and trailing rearwardly and downwardly therefrom so as to carry the test wheel 7 at a rear end thereof in the wheel plane 71 which is different from said forward plane 91.

The arm 5 forms a flat strap of metal welded at its forward end to a bottom leg of an angle bracket 53 where the upstanding leg of the angle bracket is attached to the shaft 6 by U-clamps 54 and 55 so that the arm pivots about the axis of the shaft 6 in a bearing 56 carried on a vertical plate 57 attached to the shaft 4.

The first swivel connection defined by the bearings 41 and 42 allows said upstanding shaft 4 to swivel about the upstanding axis 43 in response to a torque applied to the suspension arm 5 about the upright axis 43 by the test wheel 7 running in a wheel plane 71 different from the forward plane 91.

The second swivel connection defined by the shaft 6 and the bearing 56 allows the suspension arm and the test wheel to pivot about the horizontal axis 62 upwardly and downwardly to accommodate changes in ground height.

The sensor 19 connected between the arm 192 and the wall 195 of the frame is responsive to changes in the angle between the direction plane and the wheel plane caused by changes in coefficient of friction. That is, as the friction increases, the wheel slips toward the plane 91 and this rotation is communicated through the arm 5 to the shaft 4 and thus to the sensor 19. The display 20 acts for displaying data related to the changes in angle detected by the sensor.

The sensor 19 is connected to the upstanding shaft 4 adjacent an upper end and the suspension arm 5 and the second swivel connection 6 are connected to the upstanding shaft 4 adjacent a lower end. These are separated by a divider shield 92 separating the test wheel, the suspension arm and the lower end of the upstanding member below the divider shield 92 from the sensor 19 adjacent the upper end of the shaft above the divider shield. The divider shield can be provided by a floor pan of the vehicle such as the box floor of a pick-up. However also the divider shield can comprise a bottom plate of a box attached to the vehicle. The divider shield acts as a plate preventing material ejected from the test wheel running on the ground from accessing the sensor. The divider shield 92 has an opening 93 in the floor panel through which the upstanding shaft 4 passes.

The upstanding shaft is mounted in upper and lower bearings 41 and 42 defining the first swivel connection where the upper bearing 41 is above the divider shield and the lower bearing is below the divider shield.

The sensor 19 is carried by the support frame 191 attached to the upper bearing 41, and the second swivel connection 6 and the suspension arm 5 are connected to the upstanding shaft 4 above or at same elevation as the lower bearing 42 and the second swivel connection 6 and the suspension arm 5 are connected to the upstanding member by a flexible plate 45 allowing flexible coupling therebetween.

The spring assembly 17, 22 applies a spring force between the stabilizer arm 192 and the vehicle about generally upright axis 43 tending to rotate the shaft 4 and test wheel 7 carried thereby around the axis 43 to a position defining for the wheel plane 71 of the test wheel an angle of yaw relative to a forward plane 91, such that, when the vehicle is traveling along the forward plane 91 with adequate co-efficient of friction, the test wheel tends to lie with the wheel plane 71 parallel to the forward plane 91 and, when the co-efficient of friction is reduced, the wheel plane 71 tends to revert to the angle of yaw. The test wheel is aligned so that it points directly at the vertical axis of the upstanding shaft. While it points in that direction it leans to the right when viewed from behind. It only leans about 1 degree to keep the test tire wear even. Otherwise the tread wears unevenly.

The initial angle of yaw is a starting point for the calibration procedure and it is between 177 to 179 degrees counter-clockwise from the direction of forward travel when the two coil springs 17, 22 are equally compressed and therefore no torque is being applied by the springs. The torque values at ascending angles of yaw throughout the range from low to high road friction are decisive while the initial angle of yaw is only a starting point for calibration. The test wheel 7 is offset to the left when viewed from behind. This is significant because the gyroscopic effect of the spinning test tire has a stabilizing effect when placed in this position. When the perpendicular vector of the frictional force pushing the test tire at the contact patch creates a change in the angle of yaw this causes a torque about the perpendicular axis 43

The display 20 and control 201 comprise a gauge, computer and wireless electronic transmitter connected to said sensor to display, record, and transmit said measurements to a remote location.

The shock absorber 23 acts in a vertical plane mounted between the upstanding shaft 4 and the suspension arm 5 to impede vertical deviation during a vertical bounce and rebound cycle of the test wheel.

The steering dampener 18 is used in place of a shock absorber however the function is the same except that the steering dampener is designed to be lying in a horizontal plane and that is the reason it is used. The steering dampener moderates vibration forces occurring in a horizontal plane but does not eliminate such forces. The friction tester may be used without a steering dampener but it will not be as efficient.

The pair of horizontal coil springs 17, 22 and the linear transducer 19 are not at the same elevation as the bottom of the shaft 4 but are raised into the separate frame above the shield. These components are now connected between a second horizontal arm 192 and a second mounting frame 191, both located above the floor of the pickup truck inside the box of the truck. Since the springs and linear transducer are connected between a movable horizontal arm 192 and a mounting frame 191 fixed to the truck floor, it is important to eliminate vibration in both the horizontal arm 192 and the mounting frame 191. The upper mounting frame is vibration-free as compared to the mounting frame below the truck box which secures the intermediate component, suspension arm, and test wheel. This removal of the sensitive components from a frame subject to vibration and installing them on a second frame 191 free of vibration results in an improved performance.

In order to safeguard the coil spring pair 17, 22 from vibration, the springs are installed horizontally with outer ends attached by spring retainers and a threaded rod 171, 221 to the mounting frame in the box of the truck. The linear transducer 19 is also installed horizontally connected to a horizontal arm 192 close to the springs with the shaft 193*a* of the linear transducer lying along a chord of a circle with centre at the vertical axis 43 of rotation. The tip of the shaft of the linear transducer 19 is attached to the horizontal arm 192 by a ball joint connection 194*a*. The body of the linear transducer 19 is mounted on a ball joint connection swivel 195*a* and this swivel is at the same radius from the axis of rotation as the tip of the shaft of the transducer thus ensuring that the shaft of the transducer lies along a chord of the circle when the horizontal arm moves about the vertical axis of rotation. The placement ensures zero side load on the shaft and accuracy. The ball joint connection swivel 195*a* is bolted to the mounting frame 191 at wall 196 in the box of the truck and this mounting frame 191 is preferably fixed to the trucks frame rails as well as the sheet metal floor, by bolting through the floor to brackets attached to frame rails. This is done since the coil springs will place a horizontal load on the mounting frame.

The amount of rotation of the intermediate component about the axis 43 of rotation is proportional to increasing or decreasing frictional force between the test tire 7 at the angle of yaw and the road surface. This rotational movement is also measured by the linear transducer 19 since the movement of the horizontal arm 192 is in proportion to the rotation of the intermediate component. This is accomplished by a four-piece apparatus fixed on top of the intermediate component. This apparatus is bolted to the intermediate component and moves around the axis 43 of rotation.

The shaft assembly 4 is attached to the lower mounting frame by U-bolts at a bracket 46 which is an angle member including a flange 47. The bracket 46 is welded to the primary mounting frame 1. The bracket 46 may be 12" or more below the truck frame. The bearing 42 used to mount the intermediate component to the truck via a truck mounting frame requires a design to withstand thrust and moment forces which will be imparted to the bearing when the test tire hits bumps.

Figure 4:
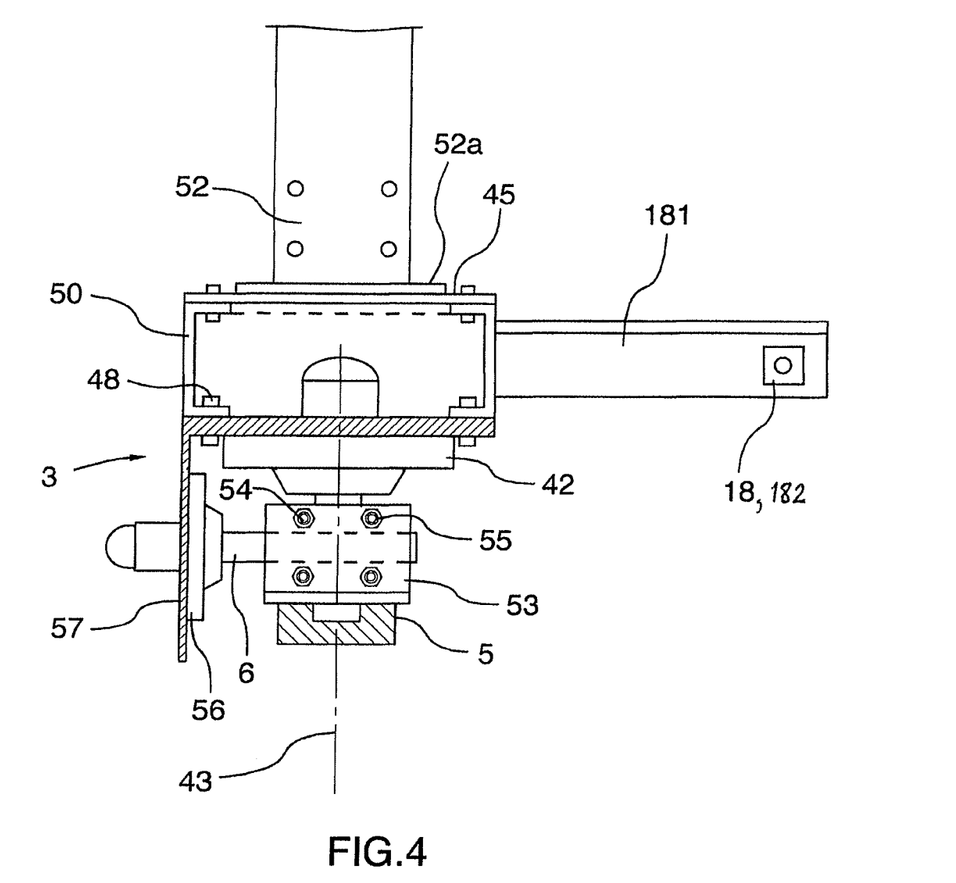
FIG. 4 is a view along the lines 4-4 of FIG. 2 of the embodiment of FIG. 1.

The intermediate component 3 has two joined bolting flanges that are perpendicular to each other. The bolting flange lying in a horizontal plane xx is bolted to the rotatable bearing 42 and the vertical bolting flange 57 is bolted to the rotatable bearing 56. A component 50 has been designed to allow a flexible plate to sit in a horizontal plane above the top of the bearing 42, clearing the grease cap, while being attached to the intermediate component by bolts 48. The component 50 has bolt holes provided for attaching a flexible horizontal plate 45 at its edges. The vertical post 51 is bolted by U-clamps 54 to the bracket 52. The bracket 52 has a horizontal base plate 52a (see FIG. 4). The base plate 52 is bolted to the horizontal flexible plate 45 while the component 50 attaches the perimeter of the horizontal flexible plate 45 to the intermediate component 3. The post 51 protrudes through the hole cut in the floor of the truck box. The horizontal arm 192 above the truck box floor is bolted to the top end of the post 51 and the horizontal springs 17, 22 and transducer 19 are attached to this horizontal arm 192.

To steady the post 51 and horizontal arm 192 while ensuring that the vertical axis of rotation of those components is coincident with the axis 43, the machined shaft 4 is clamped to bolting connections 55 at top and bottom of the post with the centre line of the shaft 4 coincident with the vertical axis of rotation 43, with the top end of the shaft 4 passing through a bearing 41 that has been installed on the mounting frame 191 in the box of the truck.

That is, the apparatus connecting the intermediate component to components in the truck box has the following 4 main sub-assemblies or parts; the component 50 and horizontal flexible plate 45 which together make one sub-assembly, the vertical post 51 of structural tubing or a solid structural shape, the vertical machined shaft 4 which is rotatably held by a bearing at the upper end, and the horizontal arm 192 that bolts to the top of the post. The four-piece apparatus attached between the intermediate component and the upper mounting frame is subject to unwanted vibration at the lower end where it is bolted to the intermediate component however the horizontal flexible plate 45 at the lower end of the vertical shaft 4 has sufficient flex that unwanted vibration does not continue to the top of the vertical post 51 but is absorbed in the horizontal plate and also in flex of the vertical post. The bearing 41 at the top of the vertical shaft 4 ensures that the top of the post 51 and the horizontal arm 192 are steadied against the vibration which occurs at the lower end.

The primary mounting frame is bolted rigidly to the frame rails of the truck and is specifically designed for supporting the intermediate component at the correct location as well as providing a bracket 182 for attachment of one end of the steering dampener 18. The trailing suspension arm 5 is at a slight downward incline from forward end to rearward end. The importance of having the suspension arm 5 at a correct slope is what determines the elevation at which the bearing 56 is mounted to the main mounting frame to connect the intermediate component. This frame is therefore designed to securely hold the intermediate component at the correct elevation and the correct position in relation to the wheel track and the hole through which the vertical post must pass.

The primary mounting frame carrying the lower end of the system is designed to have a first friction tester mounted behind the left wheel of the vehicle and a second tester (not shown) behind the right wheel. If two testers are employed the data from each is independent of the other, not combined into one measurement as in some devices measuring with two wheels.

The attachment point for the intermediate component on the primary frame is designed to secure the axle of the bearing in a vertical position. The location of this bearing is important as the vertical post 51 and vertical machined shaft 4 must pass through the hole 93 cut in the sheet metal of the truck box. The location of the hole 93 in the floor of the box is determined by a number of considerations such as the location of the leaf spring of the vehicle and the shape of the sheet metal of the truck box. A second optional friction tester may be mounted to the new mounting frame on the right side. The test tire of this second tester may not follow the wheel track however this will permit measurements on ground that has not been driven over. The forward side of this primary mounting frame is secured to the left and right longitudinal frame rails of the truck and the back part is secured to the cross member of a trailer hitch. The frame is connected at a minimum of four points to resist moment forces in all directions without placing local strain on the truck's components. All components below the truck box should be galvanized when practical to do so including bolts.

The steering dampener 18 is connected from a horizontal arm 181 on the intermediate component to a bracket 50 on the main mounting frame. The main purpose of the steering dampener is to partially dampen short, sharp, temporary side forces on the test tire which are caused by anomalies of the road surface, not by friction.

The use of the bearing 41 at the top end of the machined shaft ensures that no vibration is carried to the upper horizontal arm 192 that would be recorded by the linear transducer. The elimination of vibration is the result of a number of elements of the design.

An advantage of the four-piece apparatus, bolted together to make one solid apparatus is that it moves in unison about a common vertical axis 43 of rotation since it is connected to the intermediate component. A change in the angle of yaw of 1 degree as the wheel and suspension arm rotate about the vertical axis 43 of rotation causes the horizontal arm 192 above the floor of the truck box to also rotate 1 degree. There is a minimum number of hinged connections which is important because internal friction resistance caused by either bearings or bushings is to be minimized.

The linear transducer 19 measures friction by measuring the rotational movement i.e. change in angle, about a vertical axis of rotation. The vertical plane lying along the direction of travel is the reference to measure a change in angle. The angle between that vertical plane and a second vertical plane through the geometric centre of the test wheel and the vertical axis of rotation of the intermediate component, is the angle to be measured continuously while testing. A change in this angle is measured by the linear transducer. The transducer measures the change in length of a chord of a circle, the length of the chord changing proportionally to the change in the angle of yaw. The two ball joint connections 194a and 195a which hold the linear transducer are at each end of the chord.

The present arrangement includes a test wheel and suspension arm connected at the forward end by a bearing with horizontal axis of rotation to the intermediate component to allow the suspension arm to move, as well as a shock absorber between the suspension arm and the intermediate component.

In the present arrangement, the installed position will preferably be the left side of the direction of travel and the net force of the coil springs will impart a clockwise torque to push the test wheel to the left while the frictional force of the road will push the test wheel to the right.

The plane of the test wheel preferably includes a slight tilt to the right to maintain even wear rate across the profile of the tire.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for measuring a co-efficient of friction of a paved road surface comprising:
   a test wheel for rolling on the paved road surface;
   a frame structure arranged to be attached to a road transportation vehicle moving along a forward plane of forward travel at a location thereon such that the test wheel rolls on the road surface in a wheel plane as the vehicle moves in the forward plane over the road surface;
   an upstanding member pivotally connected to said frame structure by a first swivel connection for pivotal movement about an upstanding axis;
   a suspension arm pivotally connected to said upstanding member by a second swivel connection about a horizontal axis and trailing rearwardly and downwardly therefrom so as to carry said test wheel at a rear end thereof in said wheel plane different from said forward plane;
   said first swivel connection allowing said upstanding member to swivel about said upstanding axis in response to a torque applied to said suspension arm about the upstanding axis by said test wheel running in the wheel plane different from the forward plane;
   said second swivel connection allowing said suspension arm and the test wheel to pivot about the horizontal axis upwardly and downwardly to accommodate changes in ground height;
   a sensor responsive to changes in an angle of yaw between the forward plane and the wheel plane caused by changes in the coefficient of friction allowing the wheel plane to move out of the forward plane;
   and a display for displaying data related to the changes in angle of yaw detected by the sensor;
   wherein the upstanding member is mounted in upper and lower bearings defining the first swivel connection;
   wherein said sensor is connected to the upstanding member at or adjacent an upper end of the upstanding member;
   wherein said suspension arm and the second swivel connection are connected to the upstanding member at or adjacent a lower end of the upstanding member;
   wherein there is provided a divider shield panel having an opening in therein through which the upstanding member passes;
   wherein the sensor and the upper bearing are mounted on a support of the frame structure located wholly above the divider shield panel for attachment to the vehicle;
   wherein the suspension arm, the test wheel and the lower bearing of the upstanding member are located wholly below the divider shield panel;
   and wherein the divider shield panel acts to separate the suspension arm and the test wheel below the divider shield panel from the sensor adjacent the upper end of the upstanding member above the divider shield panel.

2. The apparatus according to claim 1 wherein the second swivel connection and the suspension arm are connected to the upstanding member above the lower bearing and wherein the second swivel connection and the suspension arm are connected to the upstanding member by a member allowing flexible coupling therebetween.

3. The apparatus according to claim 1 wherein the second swivel connection and the suspension arm are connected to the upstanding member by a member allowing flexible coupling therebetween.

4. The apparatus according to claim 3 wherein the member allowing flexible coupling comprises a flexible plate.

5. The apparatus according to claim 1 wherein the divider shield panel is attached to the vehicle.

6. The apparatus according to claim 1 wherein the divider shield panel comprises a floor panel of the vehicle.

7. The apparatus according to claim 1 wherein there is provided a stabilizer arm attached to the upstanding member for pivotal movement therewith and a spring assembly applying a spring force between the stabilizer arm and the support of the frame structure about said upstanding axis tending to rotate said upstanding member and said test wheel carried thereby around the upstanding axis to a position defining for the wheel plane of the test wheel the angle of yaw relative to the forward plane, such that, when the vehicle is traveling along the forward plane with a first value of the co-efficient of friction, the test wheel lies with the wheel plane parallel to the forward plane and, when the co-efficient of friction is reduced relative to the first value, the angle of yaw of the wheel plane changes.

8. The apparatus according to claim 7 wherein the spring assembly comprises a first spring on one side of the stabilizer arm and a second spring on a second side of the stabilizer arm.

9. The apparatus according to claim 1 wherein the display comprises a gauge, computer and wireless electronic transmitter connected to said sensor to display, record, and transmit said measurements to a remote location.

10. The apparatus according to claim 1 wherein there is provided a shock absorber mounted between the upstanding member and the suspension arm to impede vertical deviation during a vertical bounce and rebound cycle of the test wheel.

11. An apparatus for measuring a co-efficient of friction of a paved road surface comprising:
    a test wheel for rolling on the paved road surface;
    a frame structure arranged to be attached to a road transportation vehicle moving along a forward plane of forward travel at a location thereon such that the test wheel rolls on the road surface in a wheel plane as the vehicle moves in the forward plane over the road surface;
    an upstanding member pivotally connected to said frame structure by a first swivel connection for pivotal movement about an upstanding axis;
    a suspension arm pivotally connected to said upstanding member by a second swivel connection about a horizontal axis and trailing rearwardly and downwardly therefrom so as to carry said test wheel at a rear end thereof in said wheel plane different from said forward plane;
    said first swivel connection allowing said upstanding member to swivel about said upstanding axis in response to a torque applied to said suspension arm about said upstanding axis by said test wheel running in the wheel plane different from the forward plane;
    said second swivel connection allowing said suspension arm and the test wheel to pivot about the horizontal axis upwardly and downwardly to accommodate changes in ground height;
    a sensor responsive to changes in an angle of yaw between the forward plane and the wheel plane caused by changes in the coefficient of friction allowing the wheel plane to move out of the forward plane;

and a display for displaying data related to the changes in angle detected by the sensor;

said sensor being connected to the upstanding member adjacent an upper end of the upstanding member and said suspension arm and the second swivel connection being connected to the upstanding member adjacent a lower end of the upstanding member;

wherein the upstanding member is mounted in upper and lower bearings defining said first swivel connection;

wherein the sensor is carried by a support attached to the upper bearing;

wherein the second swivel connection and the suspension arm are connected to the upstanding member above the lower bearing;

and wherein the second swivel connection and the suspension arm are connected to the upstanding member by a member allowing flexible coupling therebetween.

12. The apparatus according to claim 11 wherein the member allowing flexible coupling comprises a flexible plate.

13. The apparatus according to claim 11 wherein there is provided a stabilizer arm attached to the upstanding member for pivotal movement therewith and a spring assembly applying a spring force between the stabilizer arm and the support of the frame structure about said upstanding axis tending to rotate said upstanding member and said test wheel carried thereby around the upstanding axis to a position defining for the wheel plane of the test wheel the angle of yaw relative to a forward plane, such that, when the vehicle is traveling along the forward plane with a first value of the co-efficient of friction, the test wheel lies with the wheel plane parallel to the forward plane and, when the co-efficient of friction is reduced relative to the first value, the angle of yaw of the wheel plane changes.

14. The apparatus according to claim 13 wherein the spring assembly comprises a first spring on one side of the stabilizer arm and a second spring on a second side of the stabilizer arm.

15. The apparatus according to claim 11 wherein the display comprises a gauge, computer and wireless electronic transmitter connected to said sensor to display, record, and transmit said measurements to a remote location.

16. The apparatus according to claim 11 wherein there is provided a shock absorber mounted between the upstanding member and the suspension arm to impede vertical deviation during a vertical bounce and rebound cycle of the test wheel.

* * * * *